S. H. LANYON.
RESILIENT WHEEL.
APPLICATION FILED NOV. 21, 1914.
1,164,824.
Patented Dec. 21, 1915.
2 SHEETS—SHEET 1.
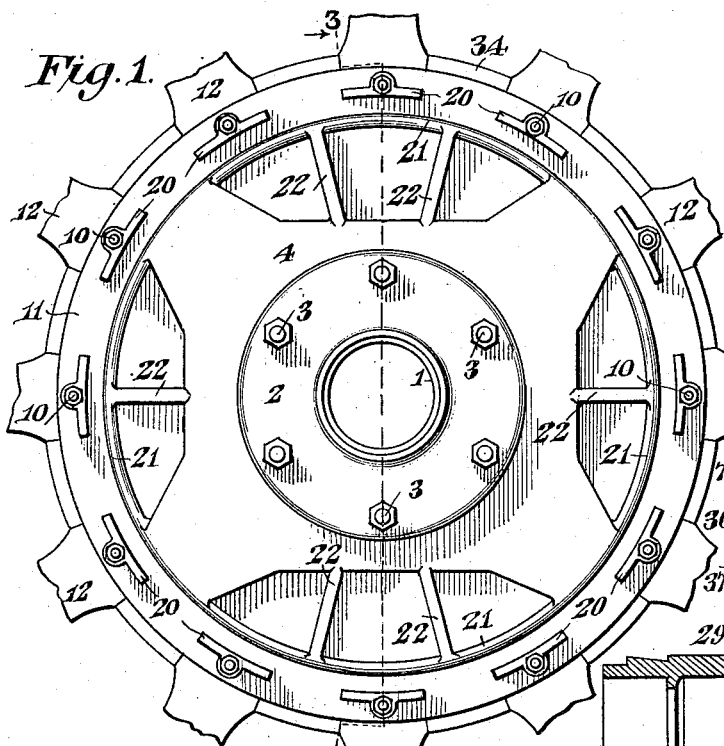
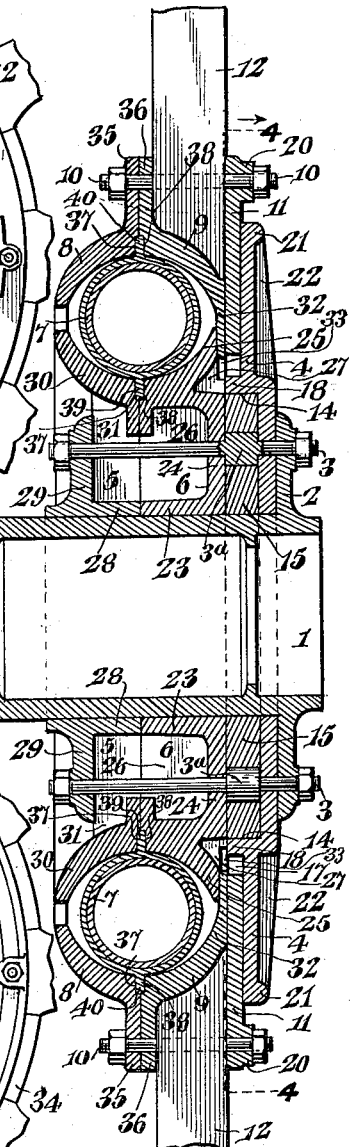
WITNESSES
INVENTOR
Samuel Herbert Lanyon,
BY
ATTORNEY

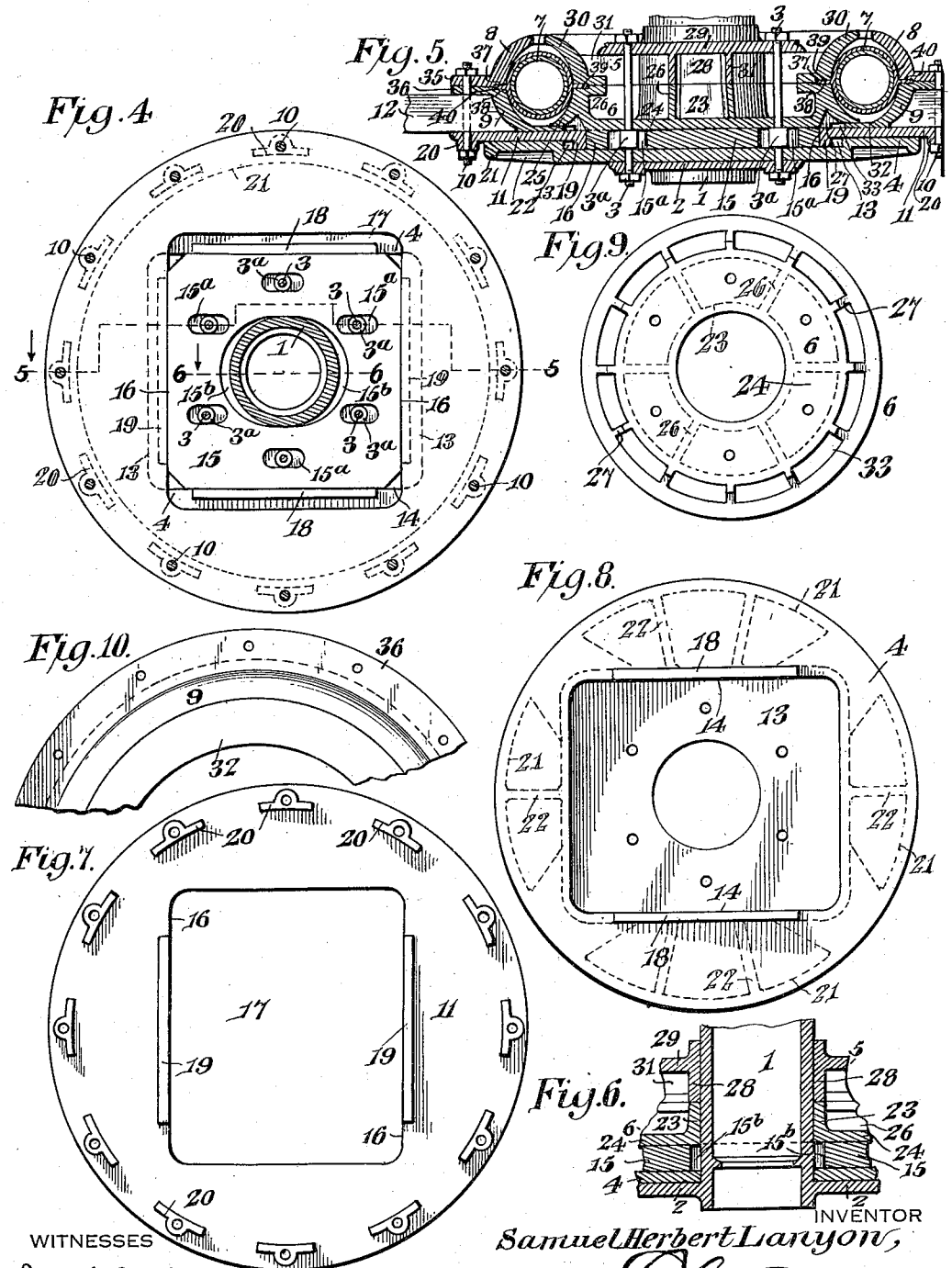

UNITED STATES PATENT OFFICE.

SAMUEL HERBERT LANYON, OF PORTLAND, OREGON, ASSIGNOR TO THE PORTLAND AUTOMOBILE WHEEL COMPANY, OF PORTLAND, OREGON.

RESILIENT WHEEL.

1,164,824.　　　　　Specification of Letters Patent.　　Patented Dec. 21, 1915.

Application filed November 21, 1914. Serial No. 873,364.

*To all whom it may concern:*

Be it known that I, SAMUEL HERBERT LANYON, a subject of the King of Great Britain, residing at Portland, in the county of Multnomah and State of Oregon, have invented a new and useful Resilient Wheel, of which the following is a specification.

The invention relates to improvements in resilient wheels.

The object of the present invention is to improve the construction of resilient wheels and to provide a simple, practical, and efficient resilient wheel of strong and durable construction, having a cushion interposed between its inner and outer portions and adapted to afford the elasticity and cushioning action of an ordinary pneumatic tire, and at the same time enable the wheel to be equipped with any desired form of tire.

A further object of the invention is to provide improved means adapted to slidably connect the inner and outer portions of the wheel and capable of affording a positive mechanical drive and of limiting the resiliency of the cushion and to prevent injury to the parts in event of a collapse of the said cushion.

With these and other objects in view the invention consists in the construction and novel combination of parts hereinafter fully described, illustrated in the accompanying drawings, and pointed out in the claims appended hereto, it being understood that various changes in the form, proportion, size and minor details of construction, within the scope of the claims, may be resorted to without departing from the spirit or sacrificing any of the advantages of the invention.

In the drawings:—Figure 1 is a rear elevation of a portion of a resilient wheel constructed in accordance with this invention. Fig. 2 is a front elevation of the same. Fig. 3 is a vertical sectional view on the line 3—3 of Fig. 1. Fig. 4 is a vertical sectional view on the line 4—4 of Fig. 3. Fig. 5 is a horizontal sectional view on the line 5—5 of Fig. 4. Fig. 6 is a detail sectional view on the line 6—6 of Fig. 4. Fig. 7 is an elevation of the guiding plate or member of the outer portion of the wheel. Fig. 8 is a similar view of the guiding plate of the inner portion of the wheel. Fig. 9 is a detail view of the rear section of the inner seat of the annular cushion. Fig. 10 is an elevation of a portion of the front section of the outer seat of the annular cushion.

Like numerals of reference designate corresponding parts in all the figures of the drawings.

In the accompanying drawings, in which is illustrated the preferred embodiment of invention, the wheel, which is designed for use on motor and various other kinds of vehicles, comprises in its construction an axle box or hub member 1 provided at its rear end with an integral outwardly extending annular flange 2, through which passes an annular series of inner connecting bolts 3, which secure the box or hub member 1 to an inner guiding plate 4 and to front and rear sections 5 and 6 of an inner annular seat for a cushion 7. The cushion 7 preferably consists of an inflated pneumatic tube, circular in cross section, but any other form of cushion may, of course, be employed. The cushion 7 is interposed between said inner annular seat and an outer annular seat composed of front and rear sections 8 and 9, secured together by an outer annular series of bolts 10, which connects an outer guiding plate 11 with the said outer seat. The bolts also pierce spokes 12, which have their inner ends secured between the rear section 9 of the outer seat and the outer guiding plate 11. The box or hub member, the inner seat, and the inner guiding plate 4 constitute the inner portion of the wheel, and the sections 8 and 9 of the outer seat, the outer guiding plate, and the spokes constitute elements of the outer portion of the wheel, which may be equipped with any desired tire and rim structure. As the tire and rim structure do not constitute any portion of the present invention, illustration thereof is deemed unnecessary. The cushion 7 permits relative movement of the inner and outer portions of the wheel and affords the resiliency and cushioning action of an ordinary pneumatic tire.

The inner guiding plate 4, which is preferably in the form of a disk, has its outer portion fitted flat against the rear face of the outer guiding plate and is provided at its inner portion in its front face with an oblong recess 13, having a greater length than width, and provided at opposite sides with parallel guiding faces 14, which slidably receive two of the parallel edges of a rectangular floating plate 15. The other two edges of the rectangular floating plate 15 are received between parallel guiding edges 16 of the outer guiding plate, which is provided with an oblong opening 17 arranged at right angles to the recess or opening 13 of the inner guiding plate. By arranging the rectangular floating plate in the guides or ways formed by the recess 13 and the opening 17 of the guiding plates 4 and 11, the inner and outer portions of the wheel are slidably connected and permitted to cushion radially in any direction, and at the same time, the said inner and outer portions of the wheel are interlocked and held against relative rotary movement, so that a positive mechanical driving connection between the hub or drive portion of the wheel and the outer or driven portion of the same is provided. The guide or way of the inner guiding plate 4 is preferably in the form of a recess, as shown, and the walls at opposite sides thereof are extended by means of parallel flanges 18, which increase the area of the guiding faces of the plate 4. The guide or way of the outer guiding plate is preferably in the form of an opening, as shown, and it is provided at opposite sides thereof with parallel flanges 19, which increase the area of the guiding faces of the outer plate 11. The projecting flanges 18 and 19 of the guiding plates, besides increasing the area of the guiding portions, interlock the guiding plates with each other, as the flanges 18 of the inner guiding plate extend into the end portions of the opening of the outer guiding plate and the flanges 19 of the latter are received within the terminal portions of the recess 13 of the inner guiding plate.

While a rectangular floating plate is illustrated in the drawings for slidably interlocking the inner and outer guiding plates, various other means may be employed for connecting the guiding plates and for permitting relative movement radially of the wheel, while locking the same against relative rotary movement. The recess 13 and the opening 17 are adapted to contain oil, grease, or any other lubricating material, which may be supplied to the relatively movable parts of the wheel in any desired manner. The inner annular series of bolts 3 are provided at the points where they pierce the floating connecting plate with integral collars or enlargements 3$^a$, operating in slots 15$^a$ of the floating plate and interposed between the rear wall of the recess 13 of the inner guiding plate and the plate or flange 24 of the rear section of the inner seat, and spacing the said parts and enabling the inner annular series of bolts to be tightened to the desired extent without clamping and interfering with the free relative sliding movement of the floating connecting plate. The slots 15$^a$ are arranged in parallelism with one another and with the guiding flanges 18 of the inner guiding plate. The floating plate is also provided with a central elliptical opening 15$^b$, receiving the box or hub member and permitting the necessary sliding movement of the floating plate relative to the outer portion of the wheel.

The relative sliding movements of the inner and outer portions of the wheel and the resiliency and cushioning action of the latter are limited by an annular series of exterior lugs or flanges 20, formed integral with the outer guiding plate and arranged at intervals near the periphery thereof. The lugs 20 are located beyond and arranged to be engaged by the peripheral edge 21 of the inner guiding plate. The annular series of lugs 20 will enable the wheel to be operated when the cushion is in a collapsed or deflated condition, without injuring the wheel. The edge 21 is preferably enlarged, as shown, and the inner guiding plate is reinforced by exterior substantially radially arranged ribs 22, extending inwardly from the enlarged periphery 21 to the recessed portion of the inner guiding plate.

The rear face of the floating slidable connecting plate fits against the rear wall of the recess 13, and the front face of the said plate fits against the rear section 6 of the inner seat. This rear section 6 consists of an inner sleeve 23, an annular flat vertical plate or portion 24, and an outer curved wall 25, connected at the inner portion with the plate 24 and supported by radial webs 26 and 27. The annular plate 24 fits against the front face of the floating rectangular plate and it extends over the rear end of the sleeve 23, which is arranged on the box or hub member 1. The annular wall 25 presents a concave front face and the reinforcing webs 26 are arranged in the space between the sleeve 23 and the inner portion of the wall 25. The other annular series of webs 27 connect the periphery of the plate 24 with the outer portion of the wall 25 at the rear face thereof. The front section 5 of the inner seat consists of a sleeve 28, a front annular vertical plate or flange 29, an annular wall 30, and an annular series of integral webs 31, which connect the wall 30 with the sleeve 28 and the plate or flange 29. The sleeve 28, which is arranged on the box or hub member, fits against the sleeve 23 of the rear section of the inner seat, and the front wall 30, which is located beyond the periphery of the flange or plate 29, presents a rear concave face and a front convex face. The inner bolts 3 pierce the rear and front plates or flanges 24 and 29 of the front and rear sections 5 and 6 and hold the said parts firmly together.

The rear section 9 of the outer seat consists of a curved wall provided at the inner edge with a vertical annular flange or extension 32 having flat front and rear faces and fitted against the front face of the outer guiding plate and the rear face of the wall 25 of the rear section 6 of the inner seat and slidable on the said wall 25, which has a recess 33 to receive the said extension 32. The front face of the wall of the rear section 9 is concave, and the rear face is convex and forms, with the outer guiding plate 11, a tapering recess to receive the inner ends of the spokes, which are spaced apart by blocks 34, interposed between the spokes and also arranged between the rear section 9 and the outer portion of the outer guiding plate 11. The front section 8 of the outer seat also consists of a curved wall having a rear concave face and a front convex face, and the said front and rear sections 8 and 9 are provided at their outer portions with annular attaching flanges 35 and 36, fitted together and pierced by the outer annular series of bolts 10. The opposed peripheral edges of the front and rear walls of the inner and outer seats are normally spaced apart and are maintained in such spaced relation by the annular cushion. The concave faces of the inner and outer walls form semi-elliptical seats and provide an annular substantially elliptical space for the reception of the pneumatic cushion, which is preferably circular in cross section. By employing the cushion which is circular in cross section and seats which form an elliptical cushion receiving space having its major axis transversely of the wall, intervening side spaces are formed between the side portions of the cushion and the side walls of the seat to permit the veritcal compression and lateral distention of the cushion without chafing against the side walls of the seats or pinching the cushion between the opposed side edges thereof. The space at the sides of the cushion may be formed in any other desired manner to permit this free action of the cushioning means.

In order to prevent the pneumatic cushion from creeping around circumferentially of either the inner or outer seats. the sections of the said seats are recessed adjacent to their meeting edges to form inner and outer centrally arranged annular grooves 37 and 38, which receive inner and outer annular fins 39 and 40 of the cushion. The fins or flanges, which are preferably arranged in the same vertical plane, are clamped in the inner and outer grooves 37 and 38 between the side walls thereof and the cushion is firmly held against circumferential creeping.

Instead of employing a pneumatic cushion, as illustrated in the accompanying drawings, the wheel may be equipped with a cushion comprising opposite rows of springs, and a plurality of cushions and driving devices may be employed if desired. Also, the improvements are applicable to flanged wheels as well as to wheels having the ordinary tires.

What is claimed is:—

1. A wheel of the class described comprising inner and outer portions, interposed cushioning means, inner and outer guiding plates slidable on each other and provided with ways arranged in intersecting planes and in registry with each other, and a floating element operable in the said ways, said floating element interlocking the plates to hold the same against relative rotary movement and allowing relative movement radially of the wheel to permit the cushioning action of the said cushioning means.

2. A wheel of the class described comprising inner and outer portions, interposed cushioning means, inner and outer guiding plates provided with ways arranged at right angles to each other and in registry with each other, and a rectangular floating plate operating in the said ways, said floating plate holding the guiding plates against relative rotary movement and allowing relative movement radially of the wheel.

3. A wheel of the class described comprising inner and outer portions, interposed cushioning means, inner and outer guiding plates having oblong apertures forming ways and arranged at right angles to each other, a rectangular floating plate operating in the apertures and interlocking the guiding plates against relative rotary movement and permitting relative radial movement and means for connecting the guiding plates together for controlling the radial movement of the outer guiding plate.

4. A wheel of the class described comprising inner and outer portions, interposed cushioning means, inner and outer guiding plates having ways arranged in intersecting planes, and a floating plate operating in the ways of the guiding plates, the latter being provided at the ways with projecting means for interlocking them with each other.

5. A wheel of the class described comprising inner and outer portions, interposed cushioning means, an inner guiding plate carried by the inner portion of the wheel and provided with a substantially oblong recess and having projecting flanges at the sides thereof, an outer guiding plate having a substantially oblong opening receiving the flanges of the inner guiding plate, said outer guiding plate being provided at opposite sides of its opening with projecting flanges fitting in the recess of the inner guiding plate, and a floating plate operating in the recess and the opening of the guiding plates and interlocking the same to hold the guiding plates against relative rotary movement while permitting relative movement radially of the wheel.

6. A wheel, comprising inner and outer portions having cushioning means interposed therebetween, inner and outer guiding plates provided with ways arranged to register with each other, and a floating element mounted in said ways for interlocking the plates to hold the plates against rotary movement, and allowing movement radially of the wheel, said floating element being provided with an elliptical opening through which the hub or axle box extends to permit of a sliding movement of the floating element relative to the outer portion of the wheel.

7. A wheel of the class described including an outer portion having an outer annular seat and provided at the rear side thereof with a vertical flange or extension, said outer portion of the wheel being also provided with an outer guiding plate fitted against the flange or extension, an inner wheel portion comprising an inner annular seat and having its rear portion slidably fitted against said flange or extension of the outer seat, an inner guiding plate slidably fitted against the outer guiding plate, means for interlocking the guiding plates to hold the same against relative movement radially of the wheel, and a cushion interposed between the inner and outer seats.

8. The combination of a hub having an outwardly extending flange, a rigid inner portion composed of an inner seat and an inner guiding plate, said inner seat composed of inner and outer sleeves mounted on the hub, annular plates connected to the outer edges of the sleeves, webs connected to the outer surfaces of the sleeves and the inner faces of the annular plates, annular walls mounted on the outer edges of the webs, said inner seat being divided along the inner edges of the sleeves and annular walls, bolts passing through the outwardly extending flange, inner guiding plate and annular plates for fastening them together, an outer seat composed of front and rear sections, said outer seat having its line of division in alinement with the line of division of the inner seat, and an outer guiding plate working between the rear section of the outer seat and inner guiding plate.

9. A wheel of the class described including a box or hub member, an inner seat composed of front and rear sections mounted on the box or hub member, an inner guiding plate also mounted on the box or hub member in spaced relation with the inner seat, an outer seat, an outer guiding plate connected with the outer seat, a floating plate interlocking the inner and outer guiding plates and interposed between the inner guiding plate and the rear section of the inner seat, and fastening devices piercing the inner guiding plate, the floating plate, and the sections of the inner seat, and connecting the said parts.

10. A wheel of the class described including a box or hub member, an inner seat composed of front and rear sections mounted on the box or hub member, an inner guiding plate also mounted on the box or hub member in spaced relation with the inner seat, an outer seat, an outer guiding plate connected with the outer seat, a floating plate interlocking the inner and outer guiding plates and interposed between the inner guiding plate and the rear section of the inner seat, and fastening devices connecting the inner guiding plate and the sections of the inner seat and having spacing means interposed between the inner guiding plate and the rear sections of the inner seat and operating in apertures of the floating plate.

11. A wheel comprising inner and outer portions having cushioning means interposed therebetween, inner and outer guiding plates provided with oblong apertures forming ways and arranged parallel to each other, and a floating plate operable in the oblong apertures of the guiding plates for interlocking the guiding plates against rotary movement, and allowing movement radially of the wheel.

12. A wheel, comprising a hub or axle box, and inner and outer portions having cushioning means interposed therebetween, inner and outer guiding plates provided with oblong apertures arranged at right angles to each other and in registry, and a floating plate mounted in the apertures of the guiding plates for interlocking the plates to hold them against rotary movement, and allowing movement radially of the wheel, said floating plate having an elliptical opening through which the hub or axle box extends to permit of a sliding movement of the floating element relative to the outer portion of the wheel.

In testimony, that I claim the foregoing as my own I have hereto affixed my signature in the presence of two witnesses.

SAMUEL HERBERT LANYON.

Witnesses:
A. G. DOOLITTLE,
F. J. LICHTENBERGER.